United States Patent
Pan et al.

(10) Patent No.: US 11,345,975 B2
(45) Date of Patent: May 31, 2022

(54) METHOD FOR COMPREHENSIVE RECOVERY OF SILVER-CONTAINING LEAD SLAG

(71) Applicant: Beijing University of Technology, Beijing (CN)

(72) Inventors: De'an Pan, Beijing (CN); Yufeng Wu, Beijing (CN); Liquan Li, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 975 days.

(21) Appl. No.: 16/073,805

(22) PCT Filed: Nov. 21, 2017

(86) PCT No.: PCT/CN2017/108239
§ 371 (c)(1),
(2) Date: Jul. 30, 2018

(87) PCT Pub. No.: WO2018/082516
PCT Pub. Date: May 11, 2018

(65) Prior Publication Data
US 2019/0032170 A1   Jan. 31, 2019

(30) Foreign Application Priority Data
Nov. 5, 2016  (CN) .......................... 201610966869.0

(51) Int. Cl.
C22B 11/00    (2006.01)
C22B 3/00     (2006.01)
C22B 7/04     (2006.01)
C22B 7/00     (2006.01)

(52) U.S. Cl.
CPC ............ *C22B 11/042* (2013.01); *C22B 7/006* (2013.01); *C22B 7/008* (2013.01); *C22B 7/04* (2013.01); *C22B 13/045* (2013.01); *Y02P 10/20* (2015.11)

(58) Field of Classification Search
CPC ........................... C22C 11/042; C22B 11/042
See application file for complete search history.

(56) References Cited

U.S. PATENT DOCUMENTS

| | | | | |
|---|---|---|---|---|
| 4,197,275 A | * | 4/1980 | Parker | C22B 3/1616 423/34 |
| 4,666,514 A | * | 5/1987 | Bertha | C22B 11/06 75/429 |
| 5,749,940 A | * | 5/1998 | Narita | C22B 3/44 75/711 |

* cited by examiner

*Primary Examiner* — Christopher S Kessler
(74) *Attorney, Agent, or Firm* — Leonid Kisselev

(57) ABSTRACT

The main steps are as follows: purification, de-leading, recovery and filtration, dissolving lead, hot filtration, cooling filtration, washing and hot decomposition, silver is recycled as silver powder, lead was recovered in the form of red lead, yellow lead and chlorinated lead respectively. Compared to existing technologies, the invention adopts a wet process, the amount of waste gas and dust produced in the process of fire treatment is reduced; silver powder, red (yellow) lead and chloride lead were obtained, it can be sold as final product with high value-added features. The tail liquid produced by the process returns to the corresponding process respectively, and the tailless liquid is discharged. The pyrolysis flue gas returns to the lead removal process, flue gas treatment process is reduced, lead smoke pollution is avoided. This method has the characteristics of simple technics and pollution-free process.

5 Claims, 2 Drawing Sheets

METHOD FOR COMPREHENSIVE RECOVERY OF SILVER-CONTAINING LEAD SLAG

CROSS REFERENCE TO RELATED APPLICATION

This application is a national stage application of International application number PCT/CN2017/108239, filed Nov. 21, 2017, titled "METHOD FOR COMPREHENSIVE RECOVERY OF SILVER-CONTAINING LEAD SLAG", which claims the priority benefit of Chinese Patent Application No. 201610966869.0, filed on Nov. 5, 2016, which is hereby incorporated by reference in its entirety.

TECHNICAL FIELD

The invention relates to a method of wet recovery of lead and silver, and particularly to a method for separation and purification method of lead and silver from lead slag of lead silver chloride.

BACKGROUND

China is a big producer and consumer of copper, the annual output of electric copper is more than 6 million tons in 2015, annual output of copper anode slime reaches tens of thousands of tons. There are valuable metals such as copper, nickel, lead, silver, tin, gold, silver and palladium in anode slime, with the increase of copper containing lead waste, and many renewable copper enterprises have obtained the related qualification of disposal of hazardous waste with lead, it has become a new technical feature and a new profit point for copper recycling enterprises to deal with lead-bearing waste, the lead content is increasing and has high comprehensive recycling value.

Normally, lead in anode slag is entered in silver separating residue through decoppering-chlorination-silver separation, silver separating residue is rich in value metals such as lead, tin and antimony, it also contains small amount of gold, silver, and palladium. There are few studies on lead-tin recovery and utilization of silver slag in China. Most smelters return silver slag to the copper reflector section (Chinese patent: 200810049459.5). The quality of anode copper may be affected by the increase of charge treatment and the accumulation of lead and tin content. So now most of the manufacturers are temporarily stacking the silver slag aside for further development and utilization. A few manufacturers sell it to some specialized precious metal recycling enterprises for processing and recycling to extract certain precious metal elements (Chinese patent: 90103200.X, 97105925.X, 200710303815.7). This extensive recycling wastes some valuable metals in the slag, and the environmental protection is not considered in the process, which not only wastes resources but also causes new environmental pollution. With the change of raw materials and the improvement of recycling technology, for silver slag and copper anode slime rich in lead tin, Wu yanxin et al. developed the use of sodium chloride-calcium chloride-sodium chlorate (trichloro method) to dispose lead containing waste [study on comprehensive recovery and utilization of tin from copper anode slime silver slag, master's thesis, Wu yanxin], lead silver chloride products is obtained, silver and lead were separated by sodium sulfite, silver is entered into the solution and lead reserve in slug. Its silver recovery rate reached 94.5%. Chinese patent CN 103060571 B disclosed a method for recovering lead from silver slag, lead chloride in trichlorination is recovered as lead by electrolysis. Silver-containing lead slag is mainly lead chloride in which silver exists in the form of silver chloride, but in the process of treating anode slime by trichlorination or separating silver slag, some impurities which slightly soluble in hydrochloric acid such as tin and antimony precipitates with lead chloride during cooling process which leads to the purity of silver lead slag is not enough, the product is also lack of value.

Silver chloride can dissolve in ammonia to form silver ammonia solution, lead chloride can dissolve in ammonium chloride solution, other impurities are basically insoluble in the above solution. Therefore, ammonium chloride-ammonia solution can be used to separate and purify lead-containing silver slag and achieve comprehensive recovery effect. At the same time, through the recycling technology, lead and silver are respectively obtained from the final product, which increases the added value of products and saves the subsequent disposal costs.

SUMMARY

The purpose of the present invention mainly solves the problem of high recycling value of silver and lead in silver lead slug, it can not only ensure effective recovery of lead and silver in silver lead slag, but also shorten the processing process with simple equipment and no tail liquid discharged.

The recovery method of silver and lead containing silver lead residue described in the present invention is as follows:

(1) Purification: add silver lead slag into ammonia-ammonium chloride solution, keep warm and stir, after filtration, the residue removal and the impurity removal solution are obtained. The composition of ammonia water-ammonium chloride solution is as follows: the mass percentage concentration of ammonia in ammonia solution is 5%~15%, ammonium chloride is 200~400 g/L, the solid mass ratio between ammonia-ammonium chloride solution and silver-lead slag solution is 5:1~30:1, reaction temperature is 30° C.~60° C., reaction time is 2-5 hours;

(2) De-leading: ammonium bicarbonate is added into the obtained purification liquid in (1), de-lead residue and de-lead solution were obtained by filtration, ammonium bicarbonate added is a room temperature saturated solution, the adding process is not ended until there is no precipitation appears.

(3) Recovery and filtration: de-lead solution obtained in (2) is added into methanol to proceed silver reduction. methanol:silver is 1:4~1:6 in molar ratio, after filtration, silver powder and reduced liquid were obtained, the solution after filtration is returned to (1) to process purification.

(4) Dissolving lead: residue removal obtained in (1) is added into sodium chloride-hydrochloric acid solution, lead powder is added to process lead dissolve, after that, lead pulp is obtained, wherein the composition of sodium chloride-hydrochloric acid solution is: the solubility of sodium chloride is 200 g/L~300 g/L, PH in solution is 0~0.5, liquid-solid ratio between sodium chloride-hydrochloric acid solution and residue removal is 20:1~30:1, reaction temperature is 65° C.~95° C., reaction time is 1-3 hours, 1 the reaction process always controls the pH of the reaction solution from 0~1, the amount of lead added is 0.5 g/L-3 g/L.

(5) Hot filtration: lead pulp obtained in (4) is heating filtrated to obtain lead-soluble slag, this slag is recovered by tri-chlorination, the hot filtration is direct filtration of lead washing paste without cooling.

(6) Cooling filtration: lead-soluble slag obtained in (5) is cooling down to room temperature to obtain lead chloride and coolant, coolant is returned to (4) to process lead dissolving.

(7) Washing: de-lead residue obtained in (2) is washed by ammonium hydroxide until there is no silver contains in washing liquid to obtain lead carbonate, washing liquid is returned to (1) to process purification.

(8) Hot decomposition: process hot decomposition for lead carbonate which is obtained in (7), red lead product is obtained when decomposition temperature is 450° C.~500° C., decomposition time is 1~2.5 h; yellow lead product is obtained when decomposition temperature is 550° C.~650° C., decomposition time is 1~2.5 h; smoke generated during hot decomposition is returned to (2) to process de-leading.

Compared with the existing technology, the present invention adopts a wet process, it reduces the amount of waste gas and dust produced in the process of fire refining; products such as silver powder, red lead (or yellow lead) and chlorinated lead is obtained. It can be sold as final product with high added value. The tail liquid produced by the process returns to the corresponding process respectively, and the tailless liquid is discharged. The flue gas in the thermal decomposition process returns to the lead removal process, so as to reduce the flue gas treatment process and avoid lead smoke pollution.

The present invention has the characteristics of simple process, common raw materials and equipment, cheap and pollution-free.

DETAILED DESCRIPTION OF THE PREFERRED EMBODIMENTS

Embodiment 1

Figure 1:
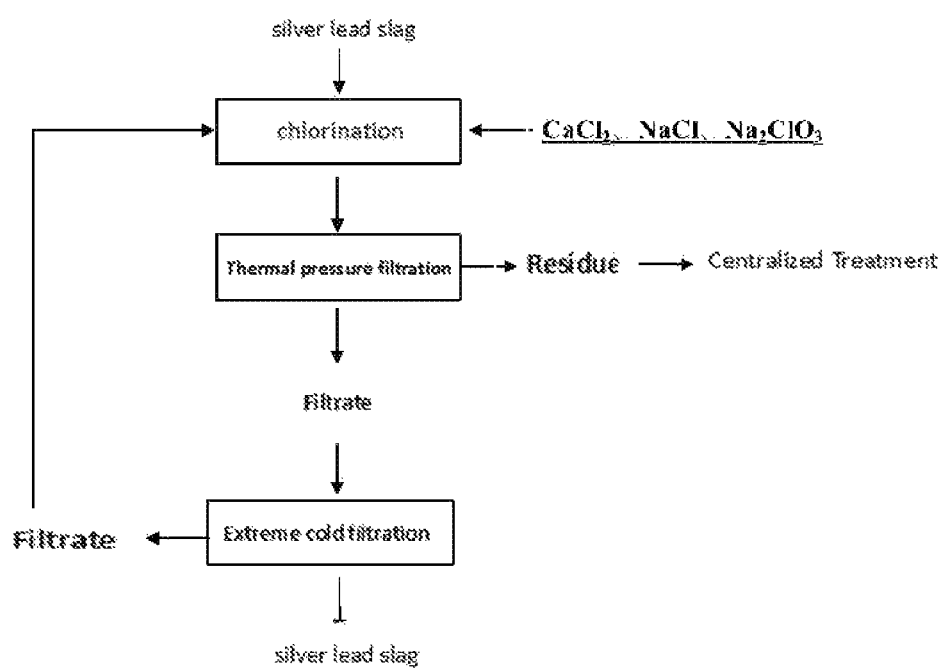
FIG. 1 shows the flow chart of trichlorination process
Figure 2:
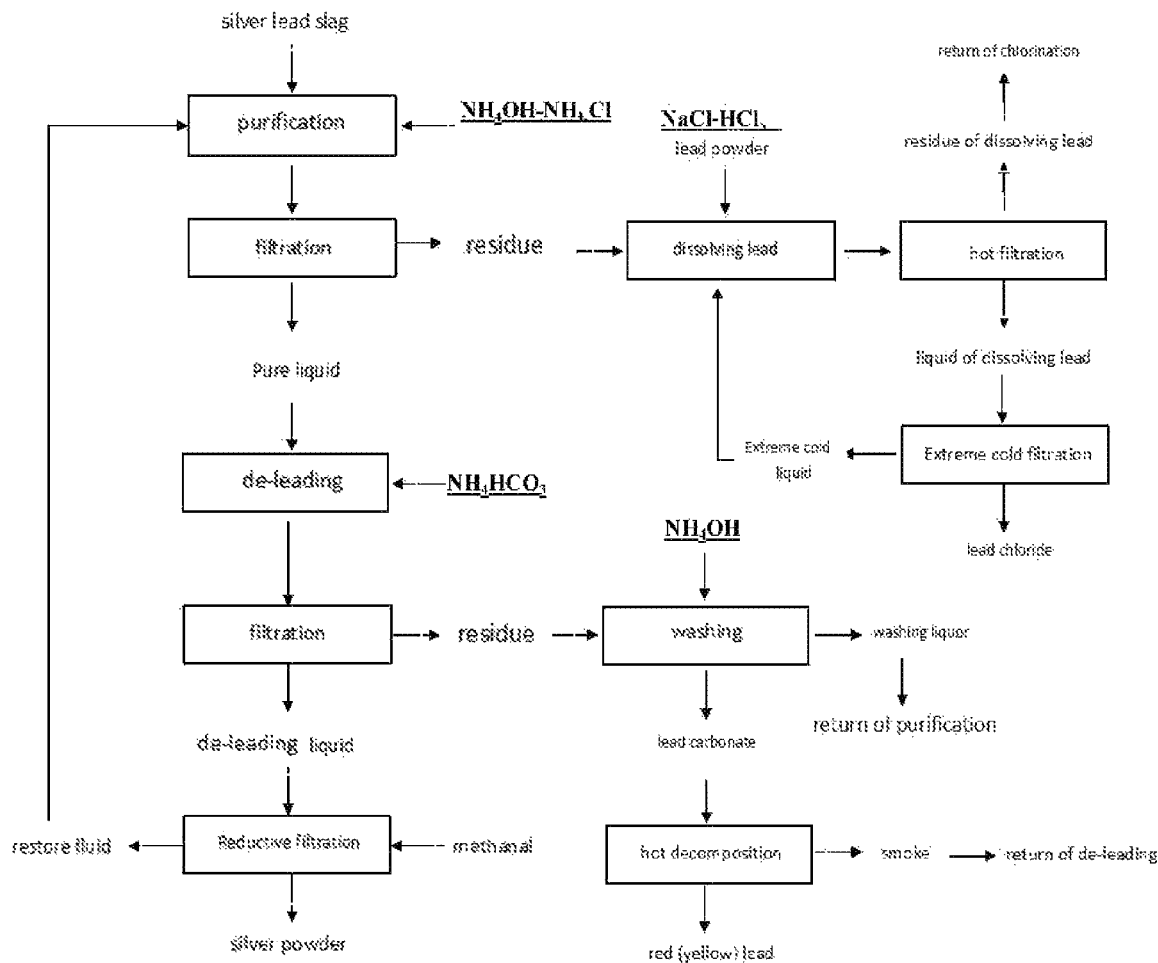
FIG. 2 shows the comprehensive recovery flow chart of silver lead slag

Follow these steps to recycle:
(1) Purification:
Add 307203 g/t silver lead slag (i.e., silver-containing lead slag) into ammonia-ammonium chloride solution, keep warm and stir, after filtration, the residue removal and the impurity removal solution are obtained. The composition of ammonia water-ammonium chloride solution is as follows: the mass percentage concentration of ammonia in ammonia solution is 5%, ammonium chloride is 200 g/L, the solid mass ratio between ammonia-ammonium chloride solution and silver-lead slag solution is 5:1, reaction temperature is 30° C., reaction time is 2 hours;
(2) De-Leading:
Ammonium bicarbonate is added into the obtained purification liquid in (1), de-lead residue and de-lead solution were obtained by filtration, ammonium bicarbonate added is a room temperature saturated solution, the adding process is not ended until there is no precipitation appears.
(3) Recovery and Filtration:
De-lead solution obtained in (2) is added into methanol to proceed silver reduction. Methanol:silver is 1:4 in molar ratio, after filtration, silver powder and reduced liquid were obtained, the solution after filtration is returned to (1) to process purification.

(4) Dissolving Lead:
Residue removal obtained in (1) is added into sodium chloride-hydrochloric acid solution, lead powder is added to process lead dissolve, after that, lead pulp is obtained, wherein the composition of sodium chloride-hydrochloric acid solution is: the solubility of sodium chloride is 200 g/L, PH in solution is 0, liquid-solid ratio between sodium chloride-hydrochloric acid solution and residue removal is 20:1, reaction temperature is 65° C., reaction time is 1 hours, the reaction process always controls the pH of the reaction solution as 0, the amount of lead added is 0.5 g/L.

(5) Hot Filtration:
Lead pulp obtained in (4) is heating filtrated to obtain lead-soluble slag, this slag is recovered by tri-chlorination, the hot filtration is direct filtration of lead washing paste without cooling.

(6) Cooling Filtration:
Lead-soluble slag obtained in (5) is cooling down to room temperature to obtain lead chloride and coolant, coolant is returned to (4) to process lead dissolving.

(7) Washing:
De-lead residue obtained in (2) is washed by ammonium hydroxide until there is no silver contains in washing liquid to obtain lead carbonate, washing liquid is returned to (1) to process purification.

(8) Hot Decomposition:
Process hot decomposition for lead carbonate which is obtained in (7), red lead product is obtained when decomposition temperature is 450° C., decomposition time is 1 h; smoke generated during hot decomposition is returned to (2) to process de-leading. The purity of lead chloride is 99.08%, silver contains in red lead is 31.4 g/t; red lead product meets the national standards GB/T 1705-1986; the purity of silver is 99.76%.

Embodiment 2

Follow these steps to recycle:
(1) Purification:
Add 278244 g/t silver lead slag into ammonia-ammonium chloride solution, keep warm and stir, after filtration, the residue removal and the impurity removal solution are obtained. The composition of ammonia water-ammonium chloride solution is as follows: the mass percentage concentration of ammonia in ammonia solution is 15%, ammonium chloride is 400 g/L, the solid mass ratio between ammonia-ammonium chloride solution and silver-lead slag solution is 30:1, reaction temperature is 60° C., reaction time is 5 hours;
(2) De-Leading:
Ammonium bicarbonate is added into the obtained purification liquid in (1), de-lead residue and de-lead solution were obtained by filtration, ammonium bicarbonate added is a room temperature saturated solution, the adding process is not ended until there is no precipitation appears.
(3) Recovery and Filtration:
De-lead solution obtained in (2) is added into methanol to proceed silver reduction. Methanol:silver is 1:6 in molar ratio, after filtration, silver powder and reduced liquid were obtained, the solution after filtration is returned to (1) to process purification.
(4) Dissolving Lead:
Residue removal obtained in (1) is added into sodium chloride-hydrochloric acid solution, lead powder is added to process lead dissolve, after that, lead pulp is obtained, wherein the composition of sodium chloride-hydrochloric acid solution is: the solubility of sodium chloride is 300 g/L, PH in solution is 0.5, liquid-solid ratio between sodium chloride-hydrochloric acid solution and residue removal is 30:1, reaction temperature is 95° C., reaction time is 3 hours, the reaction process always controls the pH of the reaction solution as 1, the amount of lead added is 3 g/L.

(5) Hot Filtration:

Lead pulp obtained in (4) is heating filtrated to obtain lead-soluble slag, this slag is recovered by tri-chlorination, the hot filtration is direct filtration of lead washing paste without cooling.

(6) Cooling Filtration:

Lead-soluble slag obtained in (5) is cooling down to room temperature to obtain lead chloride and coolant, coolant is returned to (4) to process lead dissolving.

(7) Washing:

De-lead residue obtained in (2) is washed by ammonium hydroxide until there is no silver contains in washing liquid to obtain lead carbonate, washing liquid is returned to (1) to process purification.

(8) Hot Decomposition:

Process hot decomposition for lead carbonate which is obtained in (7), red lead product is obtained when decomposition temperature is 500° C., decomposition time is 2.5 h; smoke generated during hot decomposition is returned to (2) to process de-leading. The purity of lead chloride is 98.64%, silver contains in red lead is 28.35 g/t; red lead product meets the national standards GB/T 1705-1986; the purity of silver is 99.74%.

Embodiment 3

Follow these steps to recycle:

(1) Purification:

Add 327707 g/t silver lead slag into ammonia-ammonium chloride solution, keep warm and stir, after filtration, the residue removal and the impurity removal solution are obtained. The composition of ammonia water-ammonium chloride solution is as follows: the mass percentage concentration of ammonia in ammonia solution is 7%, ammonium chloride is 300 g/L, the solid mass ratio between ammonia-ammonium chloride solution and silver-lead slag solution is 10:1, reaction temperature is 50° C., reaction time is 4 hours;

(2) De-Leading:

Ammonium bicarbonate is added into the obtained purification liquid in (1), de-lead residue and de-lead solution were obtained by filtration, ammonium bicarbonate added is a room temperature saturated solution, the adding process is not ended until there is no precipitation appears.

(3) Recovery and Filtration:

De-lead solution obtained in (2) is added into methanol to proceed silver reduction. Methanol:silver is 1:5 in molar ratio, after filtration, silver powder and reduced liquid were obtained, the solution after filtration is returned to (1) to process purification.

(4) Dissolving Lead:

Residue removal obtained in (1) is added into sodium chloride-hydrochloric acid solution, lead powder is added to process lead dissolve, after that, lead pulp is obtained, wherein the composition of sodium chloride-hydrochloric acid solution is: the solubility of sodium chloride is 250 g/L, PH in solution is 0.3, liquid-solid ratio between sodium chloride-hydrochloric acid solution and residue removal is 25:1, reaction temperature is 80° C., reaction time is 2 hours, the reaction process always controls the pH of the reaction solution as 0.5, the amount of lead added is 2 g/L.

(5) Hot Filtration:

Lead pulp obtained in (4) is heating filtrated to obtain lead-soluble slag, this slag is recovered by tri-chlorination, the hot filtration is direct filtration of lead washing paste without cooling.

(6) Cooling Filtration:

Lead-soluble slag obtained in (5) is cooling down to room temperature to obtain lead chloride and coolant, coolant is returned to (4) to process lead dissolving.

(7) Washing:

De-lead residue obtained in (2) is washed by ammonium hydroxide until there is no silver contains in washing liquid to obtain lead carbonate, washing liquid is returned to (1) to process purification.

(8) Hot Decomposition:

Process hot decomposition for lead carbonate which is obtained in (7), yellow lead product is obtained when decomposition temperature is 550° C., decomposition time is 1 h; smoke generated during hot decomposition is returned to (2) to process de-leading. The purity of lead chloride is 98.51%, silver contains in red lead is 21.17 g/t; yellow lead product meets the level of the chemical industry HG/T 3002-1983 (97; the purity of silver is 99.69%.

Embodiment 4

Follow these steps to recycle:

(1) Purification:

Add 300863 g/t silver lead slag into ammonia-ammonium chloride solution, keep warm and stir, after filtration, the residue removal and the impurity removal solution are obtained. The composition of ammonia water-ammonium chloride solution is as follows: the mass percentage concentration of ammonia in ammonia solution is 12%, ammonium chloride is 350 g/L, the solid mass ratio between ammonia-ammonium chloride solution and silver-lead slag solution is 20:1, reaction temperature is 55° C., reaction time is 3 hours;

(2) De-Leading:

Ammonium bicarbonate is added into the obtained purification liquid in (1), de-lead residue and de-lead solution were obtained by filtration, ammonium bicarbonate added is a room temperature saturated solution, the adding process is not ended until there is no precipitation appears.

(3) Recovery and Filtration:

De-lead solution obtained in (2) is added into methanol to proceed silver reduction. Methanol:silver is 1:4.5 in molar ratio, after filtration, silver powder and reduced liquid were obtained, the solution after filtration is returned to (1) to process purification.

(4) Dissolving Lead:

Residue removal obtained in (1) is added into sodium chloride-hydrochloric acid solution, lead powder is added to process lead dissolve, after that, lead pulp is obtained, wherein the composition of sodium chloride-hydrochloric acid solution is: the solubility of sodium chloride is 280 g/L, PH in solution is 0.2, liquid-solid ratio between sodium chloride-hydrochloric acid solution and residue removal is 27:1, reaction temperature is 85° C., reaction time is 1.5 hours, the reaction process always controls the pH of the reaction solution as 0.8, the amount of lead added is 2.5 g/L.

(5) Hot Filtration:

Lead pulp obtained in (4) is heating filtrated to obtain lead-soluble slag, this slag is recovered by tri-chlorination, the hot filtration is direct filtration of lead washing paste without cooling.

(6) Cooling Filtration:

Lead-soluble slag obtained in (5) is cooling down to room temperature to obtain lead chloride and coolant, coolant is returned to (4) to process lead dissolving.

(7) Washing:

De-lead residue obtained in (2) is washed by ammonium hydroxide until there is no silver contains in washing liquid to obtain lead carbonate, washing liquid is returned to (1) to process purification.

(8) Hot Decomposition:

Process hot decomposition for lead carbonate which is obtained in (7), yellow lead product is obtained when decomposition temperature is 650° C., decomposition time is 2.5 h; smoke generated during hot decomposition is returned to (2) to process de-leading. The purity of lead chloride is 99.16%, silver contains in red lead is 17.48 g/t; yellow lead product meets the level of the chemical industry HG/T 3002-1983 (97; the purity of silver is 99.53%.

Embodiment 5

Follow these steps to recycle:
(1) Purification:

Add 293057 g/t silver lead slag into ammonia-ammonium chloride solution, keep warm and stir, after filtration, the residue removal and the impurity removal solution are obtained. The composition of ammonia water-ammonium chloride solution is as follows: the mass percentage concentration of ammonia in ammonia solution is 6%, ammonium chloride is 210 g/L, the solid mass ratio between ammonia-ammonium chloride solution and silver-lead slag solution is 15:1, reaction temperature is 35° C., reaction time is 2.5 hours;

(2) De-Leading:

Ammonium bicarbonate is added into the obtained purification liquid in (1), de-lead residue and de-lead solution were obtained by filtration, ammonium bicarbonate added is a room temperature saturated solution, the adding process is not ended until there is no precipitation appears.

(3) Recovery and Filtration:

De-lead solution obtained in (2) is added into methanol to proceed silver reduction. Methanol:silver is 1:4.5 in molar ratio, after filtration, silver powder and reduced liquid were obtained, the solution after filtration is returned to (1) to process purification.

(4) Dissolving Lead:

Residue removal obtained in (1) is added into sodium chloride-hydrochloric acid solution, lead powder is added to process lead dissolve, after that, lead pulp is obtained, wherein the composition of sodium chloride-hydrochloric acid solution is: the solubility of sodium chloride is 260 g/L, PH in solution is 0.1, liquid-solid ratio between sodium chloride-hydrochloric acid solution and residue removal is 23:1, reaction temperature is 70° C., reaction time is 3 hours, the reaction process always controls the pH of the reaction solution as 0.6, the amount of lead added is 1.5 g/L.

(5) Hot Filtration:

Lead pulp obtained in (4) is heating filtrated to obtain lead-soluble slag, this slag is recovered by tri-chlorination, the hot filtration is direct filtration of lead washing paste without cooling.

(6) Cooling Filtration:

Lead-soluble slag obtained in (5) is cooling down to room temperature to obtain lead chloride and coolant, coolant is returned to (4) to process lead dissolving.

(7) Washing:

De-lead residue obtained in (2) is washed by ammonium hydroxide until there is no silver contains in washing liquid to obtain lead carbonate, washing liquid is returned to (1) to process purification.

(8) Hot Decomposition:

Process hot decomposition for lead carbonate which is obtained in (7), red lead product is obtained when decomposition temperature is 470° C., decomposition time is 2 h; smoke generated during hot decomposition is returned to (2) to process de-leading. The purity of lead chloride is 98.63%, silver contains in red lead is 16.01 g/t; red lead product meets the national standards GB/T 1705-1986; the purity of silver is 99.86%.

Embodiment 6

Follow these steps to recycle:
(1) Purification:

Add 316512 g/t silver lead slag into ammonia-ammonium chloride solution, keep warm and stir, after filtration, the residue removal and the impurity removal solution are obtained. The composition of ammonia water-ammonium chloride solution is as follows: the mass percentage concentration of ammonia in ammonia solution is 5%, ammonium chloride is 320 g/L, the solid mass ratio between ammonia-ammonium chloride solution and silver-lead slag solution is 25:1, reaction temperature is 55° C., reaction time is 3.5 hours;

(2) De-Leading:

Ammonium bicarbonate is added into the obtained purification liquid in (1), de-lead residue and de-lead solution were obtained by filtration, ammonium bicarbonate added is a room temperature saturated solution, the adding process is not ended until there is no precipitation appears.

(3) Recovery and Filtration:

De-lead solution obtained in (2) is added into methanol to proceed silver reduction. Methanol:silver is 1:5.5 in molar ratio, after filtration, silver powder and reduced liquid were obtained, the solution after filtration is returned to (1) to process purification.

(4) Dissolving Lead:

Residue removal obtained in (1) is added into sodium chloride-hydrochloric acid solution, lead powder is added to process lead dissolve, after that, lead pulp is obtained, wherein the composition of sodium chloride-hydrochloric acid solution is: the solubility of sodium chloride is 240 g/L, PH in solution is 0, liquid-solid ratio between sodium chloride-hydrochloric acid solution and residue removal is 25:1, reaction temperature is 65° C., reaction time is 2.5 hours, the reaction process always controls the pH of the reaction solution as 0.5, the amount of lead added is 2.5 g/L.

(5) Hot Filtration:

Lead pulp obtained in (4) is heating filtrated to obtain lead-soluble slag, this slag is recovered by tri-chlorination, the hot filtration is direct filtration of lead washing paste without cooling.

(6) Cooling Filtration:

Lead-soluble slag obtained in (5) is cooling down to room temperature to obtain lead chloride and coolant, coolant is returned to (4) to process lead dissolving.

(7) Washing:

De-lead residue obtained in (2) is washed by ammonium hydroxide until there is no silver contains in washing liquid to obtain lead carbonate, washing liquid is returned to (1) to process purification.

(8) Hot Decomposition:

Process hot decomposition for lead carbonate which is obtained in (7), yellow lead product is obtained when decomposition temperature is 600° C., decomposition time is 2 h; smoke generated during hot decomposition is returned to (2) to process de-leading. The purity of lead chloride is 98.59%, silver contains in red lead is 17.12 g/t; yellow lead product meets the level of the chemical industry HG/T 3002-1983 (97; the purity of silver is 99.70%.

What is claimed is:

1. A comprehensive recovery method of silver lead slag, comprising steps of:
    (1) Purification: adding silver lead slag into ammonia-ammonium chloride solution, keeping warm and stirring the ammonia-ammonium chloride solution with the added silver lead slag, and after filtration, obtaining a residue removal and an impurity removal solution;
    (2) De-leading: adding ammonium bicarbonate into the impurity removal solution obtained in step (1), and obtaining by filtration a de-lead residue and a de-lead solution;
    (3) Recovery and filtration: adding into methanol the de-lead solution obtained in step (2) to initiate a silver reduction, wherein methanol:silver is 1:4~1:6 in molar ratio, and wherein after filtration, a silver powder and a reduced liquid are obtained, wherein the reduced liquid after filtration is returned to step (1) for use in the Purification;
    (4) Dissolving lead: adding the residue removal obtained in step (1) into a sodium chloride-hydrochloric acid solution, and adding a lead powder to the sodium chloride-hydrochloric acid solution to perform lead dissolution to, after that, obtain lead pulp;
    (5) Hot filtration: hot filtrating the lead pulp obtained in step (4) to obtain lead-soluble slag, wherein the lead-soluble slag is recovered by tri-chlorination;
    (6) Cooling filtration: cooling down to room temperature the lead-soluble slag obtained in step (5) to obtain lead chloride and a coolant, wherein the coolant is returned to step (4) for use in the lead dissolution;
    (7) Washing: washing the de-lead residue obtained in step (2) by ammonium hydroxide until no silver is present in washing liquid to obtain lead carbonate, wherein the washing liquid is returned to step (1) for use in the Purification; and
    (8) Hot decomposition: performing hot decomposition of the lead carbonate which is obtained in step (7), wherein a red lead product is obtained when a temperature of the hot decomposition is 450° C.~500° C. and a time of the hot decomposition is 1~2.5 h, and wherein a yellow lead product is obtained when temperature of the hot decomposition is 550° C.~650° C. and a time of the hot decomposition is 1~2.5 h, and wherein smoke generated during the hot decomposition is returned to step (2) for use in the De-leading.

2. A comprehensive recovery method of silver lead slag in claim 1, wherein in step (1)
    a mass percentage concentration of ammonia in the ammonia-ammonium chloride solution is 5%~15%, ammonium chloride is 200~400 g/L, a solid mass ratio between ammonia-ammonium chloride solution and silver-lead slag solution is 5:1~30:1, reaction temperature is 30° C.~60° C., and reaction time is 2-5 hours.

3. A comprehensive recovery method of silver lead slag in claim 1, wherein the ammonium bicarbonate added in step (2) is a room temperature saturated solution, and wherein the addition of the ammonium bicarbonate into the obtained impurity removal solution is continued until the addition no longer causes precipitation.

4. A comprehensive recovery method of silver lead slag in claim 1, wherein in step (4) a solubility of sodium chloride is 200 g/L~300 g/L, and PH in solution is 0~0.5.

5. A comprehensive recovery method of silver lead slag in claim 1, wherein in step (4), a liquid-solid ratio between sodium chloride-hydrochloric acid solution and the residue removal is 20:1~30:1, reaction temperature is 65° C.~95° C., reaction time is 1-3 hours, 1 the reaction process always controls the pH of the reaction solution from 0~1, and the amount of lead powder added is 0.5 g/L-3 g/L.

* * * * *